June 22, 1948.  F. E. CARLSON  2,443,722
MULTIPLE IMAGE OPTICAL SYSTEM
Filed Nov. 30, 1945

INVENTOR:
FRANK E. CARLSON,
BY John H Anderson
HIS ATTORNEY.

Patented June 22, 1948

2,443,722

UNITED STATES PATENT OFFICE 2,443,722

MULTIPLE IMAGE OPTICAL SYSTEM

Frank E. Carlson, Cleveland Heights, Ohio, assignor to General Electric Company, a corporation of New York Application November 30, 1945, Serial No. 632,048

3 Claims. (Cl. 88—24)

My invention relates to optical systems and its principal object is to provide such a system and a method for producing from a single source multiple images having fixed spacial and adjustable rightness relations. Further objects and advantages of the invention will appear from the following detailed description and from the accompanying drawing which shows diagrammatically in Figs. 1 and 2 two optical systems incorporating my invention.

Figure 1:
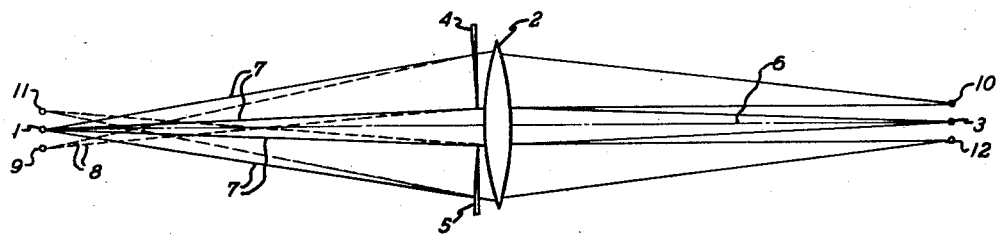

Referring to Fig. 1 of the drawing the light source 1 may be a conventional incandescent lamp for use with such systems mounted with its filament at one of the conjugate foci of the convex spherical lens 2 which forms an image 3 of the lamp filament at the other of its conjugate foci. Two prisms 4 and 5 of the kind which produce deviation without dispersion are mounted in opposing positions with respect to the principal axis, indicated at 6, of the lens 2 and in the path of light rays, indicated at 7, from the source 1 to the lens 2. The rays intercepted by the prisms 4 and 5 are refracted at an angle to their normal path to the lens 2. For example, the rays intercepted by prism 4 are refracted at such an angle that they travel in the same direction with respect to lens 2 as would rays, indicated at 8, emitted by a similar source at point 9, and they pass through lens 2 to form an image of source 1 at point 10. Similarly, the rays intercepted by prism 5 are so refracted that they appear to originate at point 11, and they pass through lens 2 to form an image of source 1 at 12. Images 10 and 12 are formed at a distance from image 3 proportional to the apparent displacement of the source 1 by the prisms 4 and 5.

The spacing of the three images 3, 10 and 12 remains fixed and is independent of the shape or size of the light source 1 and is determined by the refractive power of the prisms used. The relative brightness of the images 3, 10 and 12 may be changed as desired by adjusting the position of the prisms 4 and 5 with respect to the axis of lens 2 so as to intercept more or less light travelling from the source 1 toward the lens 2.

Figure 2:
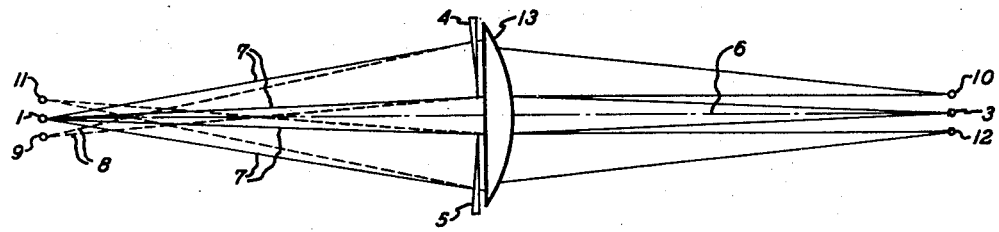

The system is of particular advantage for producing three straight, parallel lines of light. For this purpose I prefer to use a single straight incandescent filament as the light source 1 and to replace the spherical lens 2 by a cylindrical lens 13 (Fig. 2) to correct for any deviations from a straight line by the filament. The cylindrical lens 13 produces a straight line image 3 proportional in width to the apparent width of the source. Thus, three straight parallel lines of light may be produced from a single straight filament source and the relative brightness of the lines may be changed by adjusting the positions of the prisms 4 and 5 as described above. In Fig. 2 the straight filament constituting source 1 is shown parallel to the physical axis of the cylindrical lens 13 and both the filament and the lens are shown perpendicular to the plane of the paper.

What I claim as new and desire to secure by Letters Patent of the United States is:

1. An optical system comprising a light concentrating cylindrical lens having conjugate foci, a linear light source mounted at one of said foci and parallel with the physical axis of the lens and a prism mounted adjacent to said lens and between a portion of said lens and one of said foci with its edge parallel to said source so as to intercept and refract part of the light travelling between said foci to form with said lens an image displaced from and parallel with the image at the other of said foci.

2. An optical system comprising a light concentrating cylindrical lens having conjugate foci, a linear light source mounted at one of said foci and parallel with the physical axis of the lens, and prisms mounted adjacent to said lens and between said lens and one of said foci and in opposing spaced positions with respect to the principal axis of said lens with their edges parallel to said source so as to intercept and refract part of the light traveling between said foci to form with said lens an image displaced from and parallel with the image at the other of said foci.

3. An optical system comprising a light concentrating cylindrical lens having conjugate foci, a linear light source mounted at one of said foci and parallel with the physical axis of the lens, and prisms mounted adjacent to said lens and between said lens and one of said foci and in opposing spaced positions with respect to the principal axis of said lens with their edges parallel to said source so as to intercept and refract part of the light traveling between said foci to form with said lens an image displaced from and parallel with the image at the other of said foci, said prisms being mounted for movement transversely of said principal axis whereby the relative brightness of the respective images formed by the system may be regulated.

FRANK E. CARLSON.

REFERENCES CITED

The following references are of record in the file of this patent:

UNITED STATES PATENTS

| Number | Name | Date |
|---|---|---|
| 1,269,496 | Orange | June 11, 1918 |
| 1,355,805 | Banfield | Oct. 19, 1920 |
| 1,716,756 | Benford | June 11, 1929 |
| 1,984,481 | Heymer | Dec. 18, 1934 |
| 2,016,692 | Thomas | Oct. 8, 1935 |
| 2,319,489 | Carlson | May 18, 1943 |